US011906778B2

(12) United States Patent
Arbore et al.

(10) Patent No.: US 11,906,778 B2
(45) Date of Patent: Feb. 20, 2024

(54) ACHROMATIC LIGHT SPLITTING DEVICE WITH A HIGH V NUMBER AND A LOW V NUMBER WAVEGUIDE (71) Applicant: Apple Inc., Cupertino, CA (US)

(72) Inventors: Mark Alan Arbore, Los Altos, CA (US); Yi-Kuei Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 17/479,943

(22) Filed: Sep. 20, 2021

(65) Prior Publication Data
US 2022/0099889 A1    Mar. 31, 2022

Related U.S. Application Data (60) Provisional application No. 63/083,691, filed on Sep. 25, 2020.

(51) Int. Cl.
G02B 6/12     (2006.01)
G02B 27/10    (2006.01)
G02B 6/28     (2006.01)

(52) U.S. Cl.
CPC ..... *G02B 6/12007* (2013.01); *G02B 27/1006* (2013.01); *G02B 6/2808* (2013.01)

(58) Field of Classification Search
None
See application file for complete search history.

(56) References Cited

U.S. PATENT DOCUMENTS

| 4,934,775 | A | 6/1990 | Koai |
| 5,287,376 | A | 2/1994 | Paoli |
| 5,488,678 | A | 1/1996 | Taneya |

(Continued)

FOREIGN PATENT DOCUMENTS

| CN | 104614084 | 5/2015 |
| CN | 109445026 | 12/2020 |

(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

(Continued)

*Primary Examiner* — Jerry Rahll
(74) *Attorney, Agent, or Firm* — Brownstein Hyatt Farber Schreck, LLP (57) ABSTRACT

Configurations for an optical splitter are disclosed. The optical splitter may include an input waveguide, a free propagation region, and an array of output waveguides. The input waveguide may be sufficiently narrow that the light in the free propagation region may diffract and provide the same optical intensity at far field angles across a wide wavelength range. The input waveguide may have a high V number in a vertical dimension and a low V number in a horizontal dimension. Because all of the wavelengths of light diffract at the same angle in the free propagation region, once the light reaches the output waveguides, the light may have similar optical power at each of the output waveguides. Additionally, the output waveguides may vary in width and spacing to mitigate the non-uniform optical power distribution of the phase front of light.

17 Claims, 7 Drawing Sheets

(56) References Cited

U.S. PATENT DOCUMENTS

| | | |
|---|---|---|
| 5,524,156 A | 6/1996 | Van Der Tol |
| 5,544,268 A | 8/1996 | Bischel |
| 5,586,206 A | 12/1996 | Brinkman |
| 5,644,667 A | 7/1997 | Tabuchi |
| 5,647,036 A | 7/1997 | Deacon |
| 5,652,817 A | 7/1997 | Brinkman |
| 5,664,032 A | 9/1997 | Bischel |
| 5,708,674 A | 1/1998 | Berrnink |
| 5,718,989 A | 2/1998 | Aoki |
| 5,724,463 A | 3/1998 | Deacon |
| 5,742,631 A | 4/1998 | Paoli |
| 5,790,720 A | 8/1998 | Marcuse |
| 5,818,989 A | 10/1998 | Nakamura |
| 5,835,458 A | 11/1998 | Bischel |
| 5,850,411 A | 12/1998 | Major, Jr. |
| 5,911,018 A | 6/1999 | Bischel |
| 5,912,997 A | 6/1999 | Bischel |
| 5,915,165 A | 6/1999 | Sun |
| 5,978,524 A | 11/1999 | Bischel |
| 6,014,390 A | 1/2000 | Joyner |
| 6,078,704 A | 6/2000 | Bischel |
| 6,118,908 A | 9/2000 | Bischel |
| 6,122,042 A | 9/2000 | Wunderman et al. |
| 6,141,465 A | 10/2000 | Bischel |
| 6,167,169 A | 12/2000 | Brinkman |
| 6,330,378 B1 | 12/2001 | Forrest |
| 6,393,185 B1 | 5/2002 | Deacon |
| 6,415,080 B1 | 7/2002 | Sappey et al. |
| 6,522,794 B1 | 2/2003 | Bischel |
| 6,594,409 B2 | 7/2003 | Dutt et al. |
| 6,628,686 B1 | 9/2003 | Sargent |
| 6,657,723 B2 | 12/2003 | Cohen |
| 6,674,949 B2 | 1/2004 | Allan et al. |
| 6,795,622 B2 | 9/2004 | Forrest |
| 6,803,604 B2 | 10/2004 | Takahashi et al. |
| 6,842,545 B2 | 1/2005 | Lackritz et al. |
| 6,882,758 B2 | 4/2005 | Betty |
| 6,892,449 B1 | 5/2005 | Brophy et al. |
| 6,903,820 B2 | 6/2005 | Wang |
| 6,934,447 B2 | 8/2005 | Kim |
| 6,940,182 B2 | 9/2005 | Hilton et al. |
| 6,947,639 B2 | 9/2005 | Singh |
| 6,952,504 B2 | 10/2005 | Bi |
| 6,954,568 B2 | 10/2005 | Liu |
| 6,987,906 B2 | 1/2006 | Nakama et al. |
| 7,031,568 B2 | 4/2006 | Laming et al. |
| 7,054,517 B2 | 5/2006 | Mossberg |
| 7,058,245 B2 | 6/2006 | Farahi |
| 7,079,715 B2 | 7/2006 | Kish |
| 7,149,387 B2 | 12/2006 | Balakrishnan et al. |
| 7,151,635 B2 | 12/2006 | Bidnyk et al. |
| 7,189,011 B2 | 3/2007 | Harker |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,263,394 B2 | 8/2007 | Wang |
| 7,283,694 B2 | 10/2007 | Welch |
| 7,314,451 B2 | 1/2008 | Halperin et al. |
| 7,324,195 B2 | 1/2008 | Packirisamy et al. |
| 7,327,918 B2 | 2/2008 | Yamazaki et al. |
| 7,366,364 B2 | 4/2008 | Singh |
| 7,366,421 B2 | 4/2008 | Cho et al. |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,595,879 B2 | 9/2009 | Wang |
| 7,680,364 B2 | 3/2010 | Nilsson |
| 7,720,328 B2 | 5/2010 | Yan |
| 7,831,298 B1 | 11/2010 | Wang |
| 7,840,108 B2 | 11/2010 | Miyadera |
| 7,876,983 B2 | 1/2011 | Doerr |
| 7,885,302 B2 | 2/2011 | Eberhard |
| 7,885,492 B2 | 2/2011 | Welch |
| 7,970,458 B2 | 6/2011 | Norris et al. |
| 7,974,504 B2 | 7/2011 | Nagarajan et al. |
| 7,999,938 B2 | 8/2011 | Wang |
| 8,222,084 B2 | 7/2012 | Dallesasse et al. |
| 8,300,994 B2 | 10/2012 | Welch et al. |
| 8,411,260 B1 | 4/2013 | Feng |
| 8,498,681 B2 | 7/2013 | Wang et al. |
| 8,559,775 B2 | 10/2013 | Babie et al. |
| 8,564,784 B2 | 10/2013 | Wang et al. |
| 8,724,100 B1 | 5/2014 | Asghari et al. |
| 8,920,332 B2 | 12/2014 | Hong et al. |
| 8,983,250 B2 | 3/2015 | Black et al. |
| 9,020,004 B2 | 4/2015 | Jeong |
| 9,031,412 B2 | 5/2015 | Nagarajan |
| 9,052,447 B2 | 6/2015 | Luo et al. |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,348,154 B2 | 5/2016 | Hayakawa |
| 9,370,689 B2 | 6/2016 | Guillama et al. |
| 9,395,494 B2 | 7/2016 | Krishnamurthi et al. |
| 9,405,066 B2 | 8/2016 | Mahgerefteh |
| 9,543,736 B1 | 1/2017 | Barwicz et al. |
| 9,620,931 B2 | 4/2017 | Tanaka |
| 9,643,181 B1 | 5/2017 | Chang |
| 9,678,012 B2 | 6/2017 | Rothberg et al. |
| 9,759,865 B1 | 9/2017 | Lin |
| 9,766,370 B2 | 9/2017 | Aloe et al. |
| 9,784,679 B2 | 10/2017 | Rothberg et al. |
| 9,804,027 B2 | 10/2017 | Fish et al. |
| 9,817,296 B2 | 11/2017 | Sharkawy et al. |
| 9,829,631 B2 | 11/2017 | Lambert |
| 9,869,816 B2 | 1/2018 | Ishikura et al. |
| 9,880,352 B2 | 1/2018 | Florjanczyk et al. |
| 9,882,073 B2 | 1/2018 | Krasulick et al. |
| 9,943,237 B2 | 4/2018 | Baker et al. |
| 9,948,063 B2 | 4/2018 | Caneau et al. |
| 10,009,668 B2 | 6/2018 | Liboiron-Ladouceur |
| 10,126,498 B1 | 11/2018 | Marcuse |
| 10,132,996 B2 | 11/2018 | Lambert |
| 10,238,351 B2 | 3/2019 | Halperin et al. |
| 10,285,898 B2 | 5/2019 | Douglas et al. |
| 10,310,196 B2 | 6/2019 | Hutchison |
| 10,359,571 B2 | 7/2019 | Horth |
| 10,411,433 B2 | 9/2019 | Weber |
| 10,429,597 B2 | 10/2019 | ten Have et al. |
| 10,520,672 B2 | 12/2019 | Ma et al. |
| 10,529,003 B2 | 1/2020 | Mazed |
| 10,578,806 B2 | 3/2020 | Lamponi et al. |
| 10,687,718 B2 | 6/2020 | Allec et al. |
| 10,852,492 B1 | 12/2020 | Vermeulen et al. |
| 10,901,148 B2 | 1/2021 | Ma et al. |
| 10,935,726 B1 | 3/2021 | Lee |
| 10,976,489 B2 | 4/2021 | Jou et al. |
| 11,022,522 B2 | 6/2021 | Piazza et al. |
| 11,064,592 B1 | 7/2021 | Bismuto et al. |
| 11,079,542 B2 | 8/2021 | Fertig et al. |
| 11,079,547 B2 * | 8/2021 | Trita ............... G02B 6/124 |
| 11,131,809 B2 | 9/2021 | Villafranca Velasco |
| 11,231,319 B1 | 1/2022 | Tu et al. |
| 11,280,960 B2 | 3/2022 | Qi et al. |
| 11,320,720 B2 | 5/2022 | Puckett et al. |
| 11,480,731 B2 | 10/2022 | Liu et al. |
| 11,500,154 B1 | 11/2022 | Tu et al. |
| 11,506,535 B1 | 11/2022 | Tu et al. |
| 11,561,346 B2 | 1/2023 | Tu |
| 11,630,262 B2 | 4/2023 | Shin et al. |
| 11,644,619 B2 | 5/2023 | Qi et al. |
| 2002/0114572 A1 * | 8/2002 | Bouda ............... G02B 6/125 |
| | | 385/28 |
| 2003/0091265 A1 | 5/2003 | Lin et al. |
| 2003/0133663 A1 | 7/2003 | Orignac et al. |
| 2004/0126117 A1 | 7/2004 | Lo et al. |
| 2004/0131313 A1 * | 7/2004 | Van Weerden .... G02B 6/12016 |
| | | 385/37 |
| 2005/0053112 A1 | 3/2005 | Shams-Zadeh-Amiri |

(56) References Cited

U.S. PATENT DOCUMENTS

| | | | |
|---|---|---|---|
| 2005/0063431 A1 | 3/2005 | Gallup et al. | |
| 2005/0196102 A1* | 9/2005 | Yamazaki | G02B 6/125 385/48 |
| 2005/0207702 A1* | 9/2005 | Yamazaki | G02B 6/1228 385/39 |
| 2006/0002443 A1 | 1/2006 | Farber et al. | |
| 2006/0188198 A1* | 8/2006 | Charters | G02B 6/2813 385/39 |
| 2008/0044128 A1 | 2/2008 | Kish et al. | |
| 2008/0266639 A1 | 10/2008 | Melloni et al. | |
| 2008/0310470 A1 | 12/2008 | Ooi et al. | |
| 2012/0002924 A1* | 1/2012 | Okayama | G02B 6/125 385/46 |
| 2014/0029943 A1 | 1/2014 | Mathai et al. | |
| 2015/0104130 A1 | 4/2015 | Anderson et al. | |
| 2016/0224750 A1 | 8/2016 | Kethman et al. | |
| 2017/0164878 A1 | 6/2017 | Connor | |
| 2019/0052063 A1 | 2/2019 | Tolstikhin | |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |
| 2021/0033805 A1 | 2/2021 | Bishop et al. | |
| 2021/0191039 A1 | 6/2021 | Jou et al. | |
| 2021/0199576 A1 | 7/2021 | Arbore et al. | |
| 2021/0263216 A1 | 8/2021 | Bishop et al. | |
| 2021/0270699 A1 | 9/2021 | Piazza et al. | |
| 2022/0091338 A1 | 3/2022 | Tu et al. | |
| 2023/0071329 A1 | 3/2023 | Wu et al. | |
| 2023/0110382 A1 | 4/2023 | Wu et al. | |
| 2023/0125733 A1 | 4/2023 | Thomas et al. | |

FOREIGN PATENT DOCUMENTS

| | | |
|---|---|---|
| EP | 1403985 | 3/2004 |
| EP | 1432045 | 6/2004 |
| JP | H04204508 | 7/1992 |
| JP | H06003709 | 1/1994 |
| JP | 2006284791 | 10/2006 |
| JP | 2007279240 | 10/2007 |
| JP | 2008262118 | 10/2008 |
| JP | 2010223991 | 10/2010 |
| JP | 2015152729 | 8/2015 |
| JP | 2016148810 | 8/2016 |
| JP | 2018004692 | 1/2018 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

U.S. Appl. No. 17/725,418, filed Apr. 20, 2022, Wu et al.

U.S. Appl. No. 17/851,252, filed Jun. 28, 2022, Wu.

Dai et al., "10-Channel Mode (de)multiplexer with Dual Polarizations," *Laser & Photonics Reviews*, vol. 12, No. 1, Nov. 17, 2017, 9 pages.

Liu et al., "Silicon Multimode Waveguide Grating Filter at 2 μm," *Journal of Lightwave Technology*, IEEE USA, vol. 37, No. 10, May 15, 2019, pp. 2217-2222.

International Search Report and Written Opinion dated Dec. 22, 2021, PCT/US2021/051341, 14 pages.

Krubhakar et al., "Design and fabrication of integrated optical 1x8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

Dai et al., "Compact silicon-on-insulator-based multimode interference coupler with bilevel taper structure," Applied Optics, Optical Society of America, vol. 44, No. 24, 2005, pp. 5036-5041.

Li et al., "Compact and low-loss silicon power splitter based on inverse tapers," Optics Letters, Optical Society of America, vol. 38, No. 20, 2013, pp. 4220-4223.

Rasigade et al., "Compact wavelength-insensitive fabrication-tolerant silicon-on-insulator beam splitter," Optics Letters, Optical Society of America, vol. 35, No. 21, 2010, pp. 3700-3702.

U.S. Appl. No. 17/903,875, filed Sep. 6, 2022, Pelc et al.

U.S. Appl. No. 17/985,615, filed Nov. 11, 2022, Wu et al.

U.S. Appl. No. 18/142,729, filed May 2023, Dezfouli et al.

U.S. Appl. No. 18/430,275, filed Aug. 2023, Arbore et al.

* cited by examiner

ACHROMATIC LIGHT SPLITTING DEVICE WITH A HIGH V NUMBER AND A LOW V NUMBER WAVEGUIDE

CROSS-REFERENCE TO RELATED APPLICATION

This application is a nonprovisional of, and claims the benefit under 35 U.S.C. 119(e) of, U.S. Provisional Patent Application No. 63/083,691, filed Sep. 25, 2020, the content of which are incorporated by reference as if fully disclosed herein.

FIELD

This disclosure relates generally to an optical system for splitting light. More particularly, embodiments herein relate to an achromatic optical system for splitting light using a waveguide with a high V number in one dimension and a low V number in another dimension.

BACKGROUND

Generally, optical systems may employ multiple light sources for use in everyday devices. Although the systems may have multiple light outputs, there may be more light outputs than light sources as the light may be de-multiplexed or split. The optical systems may use light splitting systems that split light emitted by the light sources and may include different components such as de-multiplexers, diffraction gratings, optical splitters. These splitting components may vary from one another in different ways, such as size, optical efficiency, energy efficiency, wavelength dependence or independence, and so forth. In some examples, cascading light splitting systems may be used, but the size of the optical system may increase to an unreasonable size as the systems tend to increase in scale with the number of cascading light splitting stages. In other examples, star splitters may be used, but the free propagation region through which light propagates may cause large optical losses between the input waveguide and the output waveguides. Even though the star splitter may be size appropriate, the optical power loss may be too great to use in certain optical systems and thus a compact, low optical loss optical system may be desirable. In other examples, the light splitting systems may not perform consistently over broad wavelength ranges of light.

SUMMARY

Embodiments of the systems, devices, methods, and apparatuses described in the present disclosure are directed to an optical device for splitting or combining light. Also described are systems, devices, methods, and apparatuses directed to splitting light using an optical device based on a star splitter. In some examples, the optical splitter may function as a one by N splitter, insofar as light may be input on an input waveguide and light may be output on any number of output waveguides. The optical splitter may include an input waveguide, a free propagation region, and an array of output waveguides. In some examples, a narrow input waveguide may provide light to the free propagation region, where the input waveguide is narrow enough that the diffraction in the free propagation region may provide for similar optical intensities at far field angles across a wide wavelength range, such as spanning approximately one micron. The input waveguide may have a mode size that is proportional to the wavelength, which may provide for uniform diffraction angles. When most or all of the wavelengths diffract at similar or the same angle, once the light reaches the output waveguides, the light may have similar or the same optical power at each of the output waveguides.

In some examples, the present disclosure describes an optical splitter. The optical splitter may include an input waveguide configured to input a wavelength range of light to a free propagation region, the input waveguide configured to achieve a proportional relationship between mode size and wavelength across the wavelength range of light at an input edge of the free propagation region, the free propagation region having the input edge and an output edge, optically coupled to the input waveguide on the input edge, and configured to receive the wavelength range of light from the input waveguide, and an array of output waveguides optically coupled to the output edge of the free propagation region, wherein each waveguide of the array of output waveguides is positioned at a predetermined angle (e.g., approximately normal) to a local phase front of light received by each waveguide from the free propagation region. In some examples, the input waveguide has a high V number in a first dimension and a low V number in a second dimension, a center channel output waveguide of the array of output waveguides has a narrower width than an outer channel output waveguide of the array of output waveguides, the input waveguide causes light to diffract at a same diffraction across the wavelength range of light, and multiple output waveguides of the array of output waveguides are uniformly spaced. Additionally, at least two of the array of output waveguides have different widths and at least some of the array of output waveguides have non-uniformly spacing between one another.

In some examples, the input waveguide weakly confines light in a diffraction direction of the free propagation region. In some examples, a width of at least one of the array of output waveguides depends, at least in part, on an intensity of diffracted light in the free propagation region. In some examples, a first dimension of the input waveguide depends, at least in part, on a first V number of the input waveguide, a second dimension of the input waveguide depends, at least in part, on a second V number of the input waveguide, and the first V number is greater than the second V number. In some examples, an input waveguide mode, as measured in a first dimension, matches a waveguide mode of the free propagation region, thereby reducing optical loss. In some examples, light coupled into each of the array of output waveguides has a same power for each waveguide across the wavelength range of light. Additionally, the input waveguide is a first input waveguide, the optical splitter may include a second input waveguide positioned adjacent to the first input waveguide and optically coupled to the free propagation region, and the first and second input waveguides are symmetrically positioned to input light to the free propagation region.

In some examples, the present disclosure describes an optical splitter. The optical splitter may include an input waveguide having a high V number in a first dimension, a low V number in a second dimension and configured to input a wavelength range of light, a slab waveguide with an input edge and an output edge, the slab waveguide optically coupled to the input waveguide and configured to receive light from the input waveguide, and an array of output waveguides positioned across the output edge of the slab waveguide such that some of the output waveguides are center channel output waveguides and others of the output waveguides are outer channel output waveguides, wherein each of the array of output waveguides are arranged to receive light having approximately a same optical power. In some examples, the input waveguide has a high V number in a vertical dimension and a low V number in a horizontal dimension, a mode size of the input waveguide is proportional to a wavelength in the wavelength range of light, in the slab waveguide, a diffraction angle is the same across the wavelength range of light, and a center channel spacing is uniform for center channel output waveguides of the array of output waveguides and an outer channel spacing is half as large as the uniform spacing for outer channel output waveguides. In some examples, the input waveguide may be a strip waveguide and the array of output waveguides are strip waveguides. In some examples, multiple waveguides of the array of output waveguides have non-uniform widths and at least one waveguide width is related to a local phase front at the output waveguide of the array of output waveguides.

In some examples, the array of output waveguides are uniformly spaced apart from one another and a center channel output waveguide width is narrower than a width of an outside channel output waveguide, thereby equalizing an amount of optical power received by each output waveguide of the array of output waveguides. In some examples, the wavelength range of light is one micron. In some examples, an optical power incident upon the slab waveguide is higher in the center channels of the array of output waveguides and decreases in optical power in the outer channels of the array of output waveguides, multiple center channel output waveguides of the array of waveguides are narrower than outer channel output waveguides, thereby receiving uniform optical power across the array of output waveguides, and the multiple center channel output waveguides are spaced apart from one another by a same distance. In some examples, an outer channel output waveguide of the array of output waveguides is half a width of an adjacent channel output waveguide width and an outer channel spacing between the outer channel output waveguides is half the channel spacing of the adjacent channel output waveguides.

In some examples, the present disclosure describes an optical splitter. The optical splitter may include a strip waveguide for inputting light across a wavelength range of light, a slab waveguide configured to receive the wavelength range of light from the strip waveguide, and an array of output waveguides positioned to receive the wavelength range of light from the slab waveguide and a same amount of optical power of light is received by each output waveguide of the array of output waveguides; where a strip waveguide mode size is proportional to a wavelength in the wavelength of light and a diffraction angle of light in the slab waveguide is similar across the wavelength range of light. In some examples, a spacing between a first output waveguide and an adjacent second output waveguide of the array of output waveguides is non-uniform and depends on the optical power received by the first output waveguide and the adjacent second output waveguide, a phase front of light of the slab waveguide has a cylindrical phase front, each waveguide of the array of output waveguides is positioned normal to a local phase front of light in the slab waveguide, and the array of output waveguides are strip waveguides. In some examples, the strip waveguide has a high V number in a first dimension and a low V number in a second dimension and a strip waveguide mode in the first dimension matches a waveguide mode of the slab waveguide, thereby reducing optical loss. Additionally, a non-uniform spacing between each of the output waveguides of the array of output waveguides is based on the optical power received by each of the output waveguides such that each output waveguide receives a uniform optical power of light across the wavelength range of light spanning one micron. Further, the array of output waveguides have varying waveguide widths, thereby equalizing an optical power received from the slab waveguide.

In addition to the example aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another. Additionally, two elements that are "optically coupled" to one another may allow light to pass from one element to the other element.

In the following description of examples, reference is made to the accompanying drawings in which it is shown by way of illustration specific examples that can be practiced. It is to be understood that other examples can be used and structural changes can be made without departing from the scope of the various examples.

Generally, optical systems may employ multiple light sources emitting light that may be split, so that the number of output ports may be greater than the number of light sources. Various light splitting systems may be used to split light emitted by light sources and may include different components such as de-multiplexers, diffraction gratings, optical splitters, and so forth, and may vary from one another in different ways, such as size, optical efficiency, energy efficiency, wavelength dependence or independence, any combination thereof and so forth.

In some examples, multi-wavelength light may be split using cascading stages in a light splitting system and the light splitting system size may increase with the number of cascading light splitting stages. That is, the more light splitting stages that are used, the larger the light splitting system becomes. Because the number of cascading light splitters scale with the number of output ports, these light splitting systems may become unreasonably large and may not be easily incorporated into the overall optical system. Further, the cascading light splitters may introduce undesirable optical beating into the overall optical system.

In some examples, light may be split using a multi-mode interferometer. Generally, multi-mode interferometers may be smaller than cascading splitters and may perform consistently over small wavelength ranges, such as 10 nanometers to 50 nanometers, but may not be suitable for consistent performance over broadband wavelength ranges that may span approximately one micron.

In other examples, a star splitter may be used to split light in combination with an input waveguide, a free propagation region, and output waveguides. The input waveguide typically ends at the free propagation region where there is little confinement in the plane of the propagation region. The size of the star splitter may not scale with the number of output ports as another output waveguide may be added without causing a significant an increase in the footprint. However, the free propagation region through which light propagates may cause large optical losses between the input waveguide and the output waveguides. Even though the star splitter may be size appropriate, the optical power loss may be too great to use in certain optical systems and thus a compact, low optical loss optical system may be desirable. Additionally, star splitters may exhibit wavelength dependent performance and also may not be suitable for consistent performance over broadband wavelength ranges that may span approximately one micron.

In some examples, by starting with a narrower input waveguide than is typically used in a star splitter, the light provided to the free propagation region may then expand or spread out. In some examples, the narrower the input waveguide, the faster the light may diffract in the free propagation region. The diffraction in the free propagation region may yield similar optical intensities at far field angles across a wide wavelength range, such as spanning approximately one micron. When most or all of the wavelengths diffract at similar angles or the same angle, once the light reaches the output waveguides, the light may have similar optical power at most or all of the wavelengths at each of the output waveguides. It may be understood that when the term "same" is used herein (e.g., same angle, same optical power, same diffraction, same diffraction angle, and so forth, that the term "same" may mean in addition to being the same: similar enough to not significantly affect performance, and/or the same within standard measurement tolerances. Further, it may be understood that when the term "approximately" is used herein, this term may include a five to ten percent variation as reasonably allowed within the determined specification.

Disclosed herein is an optical splitter that includes an input waveguide, a free propagation region, and an array of output waveguides. The input waveguide may achieve a proportional relationship between mode size and a wavelength of light in the wavelength range of light and is optically coupled to the free propagation region. The free propagation region may have an input and output edge and may receive the wavelength range of light from the input waveguide; the input waveguide may be optically coupled to the input edge of the free propagation region. The input waveguide may be narrow enough that the diffraction angle is the same across the broad wavelength range of light. Each of the waveguides may be optically coupled to an output edge of the free propagation region and positioned across the output edge of the free propagation region, where each of the multiple output waveguides is positioned at a predetermined angle (e.g., approximately normal or any other suitable angle) to a local phase front of light of the wavelength range of light. The phase front is the phase of a propagating wave front. In some embodiments, the proportional relationship between the mode size and wavelength need not be exactly proportional. The relationship between mode size and wavelength may be plus or minus ten percent relative to a proportional relationship. As used herein, the term "proportional" encompasses not only a relationship where one object, element, or attribute (collectively, "object") varies directly with another or according to a particular mathematical function, but also includes instances where an object change is primarily dependent on another. Put another way, one object is proportional to another when its variance is within 10% of a direct or mathematical variance with respect to the other object.

In some examples, the input waveguide may have a high V number in a vertical dimension and a low V number in a horizontal dimension to match the waveguide mode of the free propagation region of the optical splitter. Generally, the high V number (e.g., vertical dimension) may result in low optical loss, whereas the low V number (e.g., horizontal dimension) may result in wavelength independence. A high V number in a vertical dimension and a low V number in a horizontal dimension to match the waveguide mode of the free propagation region of the optical splitter may reduce optical loss. In some examples, the width and spacing may vary (e.g, be non-uniform) between the output waveguides in the array in order to provide uniform optical power coupling and to reduce a total optical loss of the system. Additionally, the center channel output waveguides may be narrower in width than the outer channel output waveguides. Further, spacing between the output waveguides may be uniform or may vary based on the optical power of the light coupled to the output waveguides.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
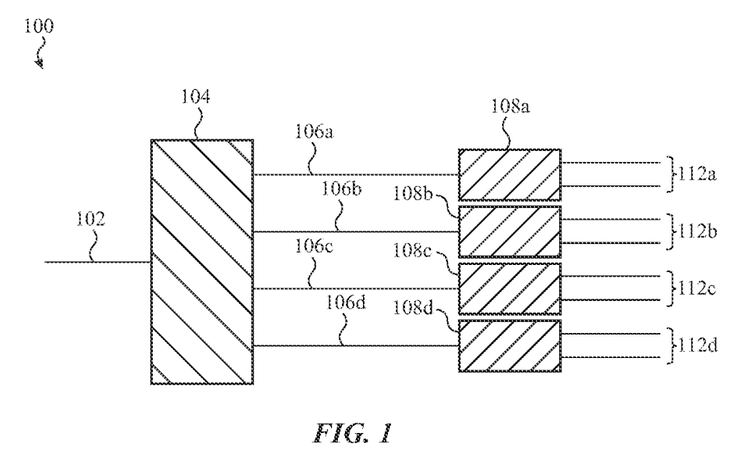
FIG. 1 illustrates a block diagram of a one by eight cascading splitter.

FIG. 1 illustrates a block diagram of a one by eight cascading splitter. The one by eight cascading splitter 100 may include an input light 102, a one by four splitter 104, intermediate light paths 106a-106d, one by two splitters 108a-108d, and light outputs 112a-112d. In FIG. 1, the one by eight splitter 100 receives a single light input via the input 102 and has eight different output ports, namely outputs 112a-112d. Splitting systems of this type may increase in size as the number of output ports increases and so may be unsuitable for applications where space is tightly controlled or at a premium, as is the case in many modern electronic devices.

The input 102 may be an input waveguide that provides input light to the one by four splitter 104. The input light may be provided by a light source, which may be connected to or otherwise integrated into a photonics device. In some examples, the photonics device may include more than one light source, such as lasers, light emitting diodes, semiconductor lasers, coherent light sources, semi-coherent light sources, any combination thereof, and so forth. In some examples, the photonics device is a device with photonics and/or optical functionality and components. The photonics device may include the optical splitters.

In the first splitting stage, the one by four splitter 104 may equally split and output light among the four intermediate light paths 106a-106d. In some examples, there may be optical loss associated with each splitting stage. In some examples, the intermediate light paths 106a-106d may be waveguides optically coupled to, and receiving light from, the one by four splitter 104. The intermediate light paths 106a-106d also may be optically coupled to the one by two splitters 108a-108d and may provide light to the one by two splitters 108a-108d. Each of the one by two splitters 108a-108d may provide light outputs 112a-112d. The one by two splitter 108a may provide two light outputs 112a, the one by two splitter 108b may provide two light outputs 112b, and so forth. As shown in FIG. 1, one by two splitter 108a may split light from intermediate light path 106a to provide this spit light along light outputs 112a, one by two splitter 108b may split light from intermediate light path 106b and provide this split light along light output 112b, and so forth. Similar to the one by four splitter 104, each of the one by two splitters 108a-108d may equally split its input light and output such split light on the light outputs 112. The second splitting stage (e.g., the one by two splitters 108a-108d) also may introduce optical loss into the system 100.

Also, the one by eight splitter 100 may increase in size with each additional splitting stage. For example, instead of a one by four splitter 104 being used, the input 102 may be provided to a one by two splitter, and then for each of those two outputs, another set of one by two splitters may be used to achieve the four intermediate outputs. Because an additional splitting stage is added in this described example, this example system may be larger than the system illustrated in FIG. 1. Because optical systems are being incorporated into smaller and smaller form factor devices, cascading splitters may be too large in size to be reasonably incorporated into the smaller form factor devices such as a mobile device.

Figure 2A:
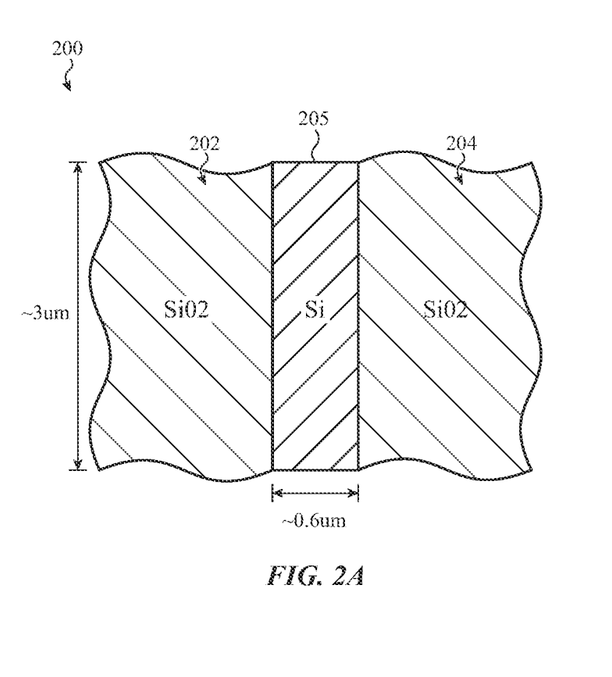
FIG. 2A illustrates a block diagram of an example waveguide.

FIG. 2A illustrates a block diagram of an example waveguide. The input waveguide 200 may produce a far field angle that may be independent of the wavelength of light in the free propagation region, in that most or all wavelengths of light may diffract at similar or the same angles within the propagation region. As previously discussed, unlike a star splitter, when a narrow input waveguide is used to input light to the free propagation region of the optical splitter, the diffraction in the free propagation region may result in similar optical intensities at far field angles across a wide wavelength range, such as spanning up to approximately one micron. Although a one micron wavelength range is described herein, it may be understood that the optical splitter may function similarly for all wavelengths of light below one micron, such as 100 nanometers or lower. The input light may propagate in a diffraction direction in the propagation region from the input waveguide and toward the output waveguide while spreading out in the propagation region. When most or all of the wavelengths diffract at a similar or the same angle, once the light reaches the output waveguides, the light output at each of the output waveguides may have the same, or similar, optical power. One way to achieve this is to employ an input waveguide 200 that produces a mode size that depends on the wavelength insofar as the a proportional relationship between mode size the wavelength may be achieved. The diffraction angle of light may be similar when the mode size is proportional to a wavelength in the wavelength of light. Further, the diffraction angle of light may be determined by the ratio of mode size to wavelength, which may result in a wavelength independent diffraction angle. In one example, the a waveguide that supports a mode of light at approximately a three micron wavelength of light may be twice as wide as the same waveguide that supports a mode of light at approximately a 1.5 micron wavelength of light.

The input waveguide 200 may generate a mode size that achieves a proportional relationship to the wavelength by weakly confining the input waveguide 200 in the plane of a substrate or in the horizontal dimension. As illustrated in FIG. 2A, the input waveguide 200 may have a first cladding layer 202, a propagation region 205, and a second cladding layer 204. The first cladding layer 202 and the second cladding layer 204 may be silicon dioxide, an oxide material, or any other suitable dielectric material, while the propagation region 205 may be silicon. In FIG. 2A, light may propagate into or out of the figure in the view shown in FIG. 2A. In some examples, the cladding layers 202 and 204 may extend beyond the illustrated boundaries in FIGS. 2A and 2B. Additionally, although not illustrated in FIGS. 2A, 2B the input waveguide 200 may be confined in each direction, around the propagation region 205, by cladding layers, except for the direction of the propagation of light in the propagation region 205. Generally, the material used for confinement may be any material with an index of refraction lower than silicon may work (e.g., silicon dioxide). Other materials such as silicon nitride or any number of polymers may also function to confine the light propagation to the propagation region 205.

The physical dimensions of the input waveguide 200 may be configured based on the first and second target V numbers and the wavelength(s) of light transmitted by the input waveguide. The V numbers and the wavelengths of light are used to generate a mode size, as discussed herein. In some examples, the input waveguide 200 may have a propagation region that is approximately two to five microns in a first dimension (e.g., a vertical dimension) and less than a micron in a second dimension (e.g., a horizontal dimension). In one example, the input waveguide may be three microns in the vertical dimension and 0.6 microns in the horizontal dimension. These dimensions may be used for an input waveguide of rectangular cross-section that transmits light having wavelengths from 1.4 microns to 2.4 microns, for example.

The V number is a normalized frequency and determines the number of modes a fiber can carry. As used herein "high V" and "low V" are relative terms. Specifically, a high V number is one that supports multiple modes of light, whereas a low V number is one that supports a single mode of light. Because the devices described here are configured to work across a range of wavelengths, it should be appreciated that high and low V numbers in these contexts are intended to apply to single or multi-mode light across this range of wavelengths. Accordingly, the actual values for a given waveguide are dependent on the target wavelength range. Further, given these wavelengths of light and the aforementioned dimensions of the input waveguide, the first (or "high") V number is 3 or greater and the second (or "low") V number is less than 3. Many embodiments may use this same cutoff even if their dimensions differ, e.g., a high V number is 3 or greater while a low V number is less than 3. In other embodiments, 3 may be a low V number rather than a high V number. Generally for many embodiments, the cutoff between a high V number and a low V number occurs where the light transitions from single mode light to multi-mode light, and may vary with the wavelengths of light propagating through the waveguide, as well as the dimension of the waveguide. Thus, the input waveguide may have a low V number with respect to a first axis and a high V number with respect to a second axis, for example where the dimension of the waveguide is smaller along the first axis but larger along the second axis.

Because the waveguide may be smaller than the wavelength of light along a short axis of the plane of the wafer (e.g., the horizontal dimension, as shown in FIG. 2A), light propagating through the input waveguide 200 may be weakly confined in this one dimension, thus generating the appropriate mode size. Further, this may result in the waveguide producing a mode of light that is roughly proportional in size to the wavelength.

The input waveguide 200 geometry, as depicted, has a high V number in a first dimension, (here, a vertical dimension) and a low V number in a second dimension, (here, a horizontal dimension). Because the input waveguide 200 has a high V number in the vertical dimension and the low V number in the horizontal dimension, the input waveguide mode of light may match the waveguide mode of the free propagation region of the optical splitting device, which may reduce optical loss. The low V number results in achieving a proportional relationship between the mode size and the wavelength and for an input waveguide that obeys the high index approximation, the high V number dimension (e.g., vertical dimension) defines a common mode size in a single axis for all wavelengths with a high V number.

Figure 2B:
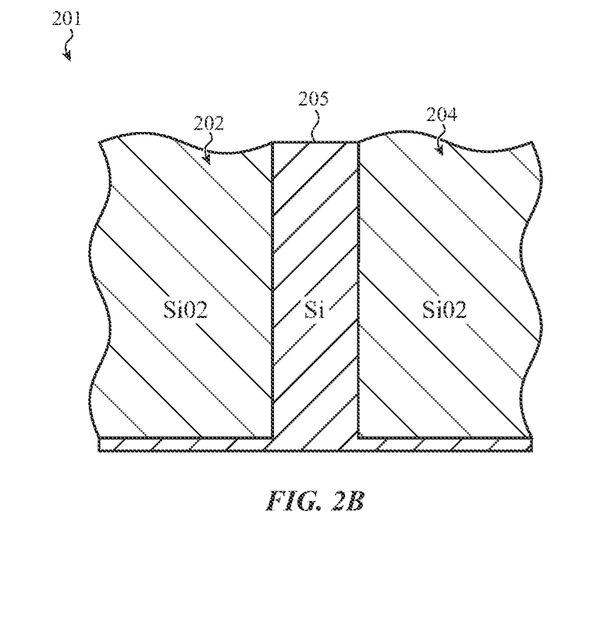
FIG. 2B illustrates an example of another waveguide.

FIG. 2B illustrates an example of another waveguide. The input waveguide 201 may function similarly to the input waveguide 200 of FIG. 2A. The input waveguide 201 may include a first cladding layer 202, a propagation region 205, a second cladding layer 204, and a base 206. The first cladding layer 202 and the second cladding layer 204 may be silicon dioxide, an oxide material, or any other suitable dielectric material, while the propagation region 205 may be silicon. In the view depicted in FIG. 2A, light may propagate along the waveguide and thus into or out of the page (e.g., FIG. 2A is a cross-sectional view of the waveguide 205, looking toward one end of the waveguide). The base 206 may be included as a foundation to the waveguide for ease of fabrication. The thickness of the base 206 should be thick enough to ease fabrication constraints, while not materially changing the functionality of the input waveguide 201 as compared to the input waveguide 200 of FIG. 2A.

Figure 3:
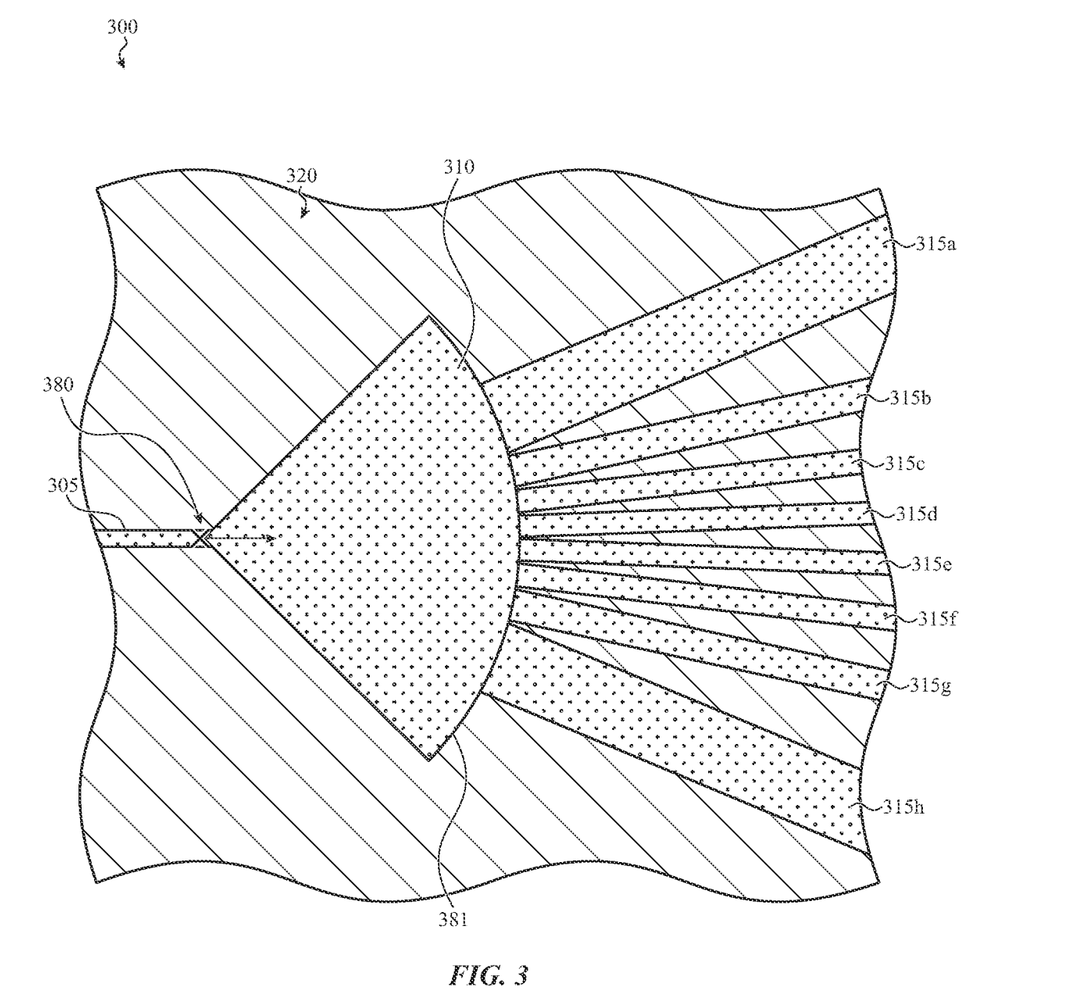
FIG. 3 illustrates an example of a one by eight optical splitter.

FIG. 3 illustrates an example optical splitter. The optical splitter 300 may receive light from an input waveguide and may output light on eight output waveguides. Although eight output waveguides are described with reference to FIG. 3, this is for explanatory purposes only and any number of output waveguides may be used. In FIG. 3, the number of input waveguides and output waveguides are used for explanatory purposes only and any number of output waveguides may be used for the one by N optical splitter. Additionally, the input waveguide is used for explanatory purposes only and two, three, or more input waveguides may be used with this optical splitter, such as for an M by N splitter (where M is the number of input waveguides and N is the number of output waveguides of the optical splitter). Further, as described herein for any embodiment, any number of input waveguides may be used with any number of output waveguides and any number of input ports may be used with any number of output ports. Further, in some examples, the number of input waveguides may be greater than one, and the total area (e.g., maximum distance along input face of the free propagation region from the centerline) that is defined by all of the input waveguides may be much smaller than the length of the free propagation region or the length of the output port or waveguide array (maximum distance along output face from the centerline).

The specific examples used herein are provided for explanatory purposes only. The optical splitter 300 may produce approximately uniform power over all the output waveguides and across a wavelength range of light spanning approximately one micron, all while maintaining a relatively small form factor. Additionally, in FIGS. 3-6, the input waveguide, the free propagation region, and the output waveguide all have the same pattern, but may be separate elements through which light propagates and that are optically coupled together.

The optical splitter 300 may include an input waveguide 305, a free propagation region 310, and multiple output waveguides 315a-315h. The free propagation region 310 may be formed from similar materials as the input waveguide 305 and multiple output waveguides 315a-315h. In some examples, the free propagation region 310 as well as the input waveguide 305 and the output waveguides 315a-315h may be surrounded by a cladding region 320, which may be an oxide material, such as silicon dioxide, or any other dielectric material that provides the same optical confining functionality. The cladding region 320 may extend beyond the depicted boundaries in FIG. 3. In other examples, the cladding region 320 may closely surround the perimeter of the optical splitter 300. The terms "multiple output waveguides" and "array of waveguides" may be used interchangeably herein. The optical splitter 300 may differ from a general star splitter in that the input waveguide 305 may confine the light to a specific mode size, due to its high V number/low V number configuration. Further, the output waveguides are configured and spaced apart from one another to account for variations in a local phase front and optical power. Additionally, while the input waveguide 305 has a different pattern than the input waveguide 205 of FIG. 2, both function similarly to one another and have similar or identical physical properties (such as V number and physical dimensions). Likewise, input waveguides 405 and 505 may have similar functionality and properties when compared to input waveguides 205 and 305. Further, although the output waveguides 315, 415, 515, and 615 may be depicted as having different lengths in each corresponding figure, this is for illustration only. In some embodiments, these output waveguides may have the same or similar lengths. Similarly, the output waveguides 315, 415, 515, 615 are illustrated as having curved output edges, but in some embodiments the output edges of the output waveguides 315, 415, 515, 615 may be straight, angled, or otherwise or shaped to efficiently couple to an adjacent or abutting optical element. The input waveguides 305, 405, 505, and 605 are depicted as a certain length, but the input waveguides may be any length. Likewise, the input waveguides 305, 405, 505, and 605 are illustrated as having curved input edges, but in some embodiments, the input edge of the input waveguides 305, 405, 505, and 605 may be straight, angled, or otherwise, or shaped to efficiently couple to an adjacent or abutting optical element.

In some examples, the input waveguide 305 may be optically coupled to the free propagation region 310, may provide light to the free propagation region 310, and may terminate at the free propagation region 310. The light propagating through the input waveguide may be a broad wavelength range of light that may span approximately one micron. The free propagation region 310 may be configured to receive the wavelength range of light from the input waveguide 305; this light may freely propagate and diffract in the free propagation region 310. Generally, the narrower the input waveguide 305, the faster the light may diffract or spread out in the free propagation region 310. As previously mentioned with reference to FIGS. 2A and 2B, the input waveguide 305 may be narrow, thus confining the light to a mode size that is on the order of the wavelength.

In some examples, the input waveguide 305 may be a strip waveguide and the output waveguides 315a-315h may be strip waveguides as well. In some examples, the output waveguides 315a-315h may instead be rib waveguides or some combination of strip and rib waveguides. Additionally, the free propagation region 310 may be a slab waveguide. It may be understood that all of the waveguides may be surrounded by a low-index cladding region to confine light to the waveguides. Generally, the waveguides described herein may include a core or propagation region, with cladding layers on both sides of the propagation region. Further, the propagation region of a waveguide is distinct from the free propagation region of the optical splitter as the free propagation region is a region where light may diffract and spread out.

Once the light passes from the input waveguide 305 to the free propagation region 310, it may diffract at about the same angle and form an approximately Gaussian diffraction wave front that may be reproduced similarly at all wavelengths. The diffracting light in the free propagation region 310 may propagate to form approximately the same (or the same) far field angle across the broad wavelength range. When the different wavelengths of light of the wavelength range diffract at approximately the same angle and once the light reaches the output waveguides, each of the waveguides may output light having approximately the same or the same optical power. By providing a mode size that may be proportional to the wavelength, the far field angle may become independent of the wavelength. In some examples, the input waveguide mode in a vertical dimension may approximately match the waveguide mode of the free propagation region 310, thereby reducing optical loss.

In some examples, the light may diffract at the same angle for all constituent wavelengths by producing a waveguide mode size that depends on and that is proportional to the wavelength, thus providing far field angles that may be independent of the wavelength of light. It may be understood that a waveguide mode size is a mode size that results from light passing through the waveguide. In some examples, by using an input waveguide 305 with a high V number in a vertical dimension and a low V number in a horizontal dimension (or vice versa depending on an orientation of the waveguide), the far field angles may be independent of wavelength as described with reference to FIG. 2A.

In some examples, the free propagation region 310 may include an input edge 380 and an output edge 381, where the input waveguide may be optically coupled to the input edge 380. The output waveguides 315a-315h of the optical splitter 300 may be coupled to the output edge 381 of the free propagation region 310. Additionally, the multiple output waveguides 315a-315h may be each positioned at a respective predetermined angle (e.g., approximately normal or any other suitable angle) to a local phase front of light. In the variation of free propagation region 310 shown in FIG. 3, as the light propagates through and diffracts in the free propagation region, the light may have a phase front that may be an approximately cylindrical phase front.

The position, width, and angle of a given output waveguide collectively impact the amount of light coupled into the output waveguide, and as such each may be selected to achieve a given light coupling to a particular output waveguide. For example, each waveguide may preferably be positioned normal to the local phase front to increase the amount of light and optical power coupling into the output waveguide, although it should be appreciated that other angles may be albeit with increased loss for an otherwise identical waveguide. In some examples, the array of waveguides 315a-315h may preferably be positioned along a circular curve (e.g., centered on where the input waveguide meets the free propagation region), such that each waveguide is positioned along the same phase front. It should be appreciated that the array of waveguides 315a-315h may be positioned along other curves, provided that losses associated with these other curves are acceptable and within the overall system specifications. As depicted in FIG. 3, output waveguide 315a may be at a different angle with respect to the free propagation region 310 than the output waveguide 315f, as each output waveguide is positioned (approximately) normal to the local phase front of light reaching the particular output waveguide.

As shown in FIG. 3, at least some the output waveguides may have different widths; these widths may vary with a location of the output waveguide relative to a center of the array of output waveguides. That is, the output waveguide widths may be non-uniform. As depicted in FIG. 3, the output waveguides 315d and 315e may be narrower as they are positioned closer to the center of the array, whereas the output waveguides 315a and 315h may be wider in width as they are positioned further to the outside of the array of output waveguides. In some examples, the width of the output waveguides 315a-315h may depend at least in part on an intensity of the diffracted light in the free propagation region 310. Thus, a width of a waveguide may increase as the waveguide's distance from a centerline of the free propagation region increases. As shown, the center to center spacing of the output waveguides relative to one another may also increase as the output waveguides increase in width toward the outside of the array, although the spacing of the output waveguides may be uniform (e.g., a distance between sidewalls or edges of adjacent waveguides may be the same, regardless of which pair of waveguides is considered) or may be spaced apart from one another by a same distance. The output waveguides may be wider toward the edge of the array because the optical power and/or intensity may decrease as the light spreads toward the edges of the free propagation region 310.

In some examples, the total system efficiency may be approximately the same across all the wavelengths of light, and the output waveguides have the same power or approximately the same power across all the wavelengths of light.

Figure 4A:
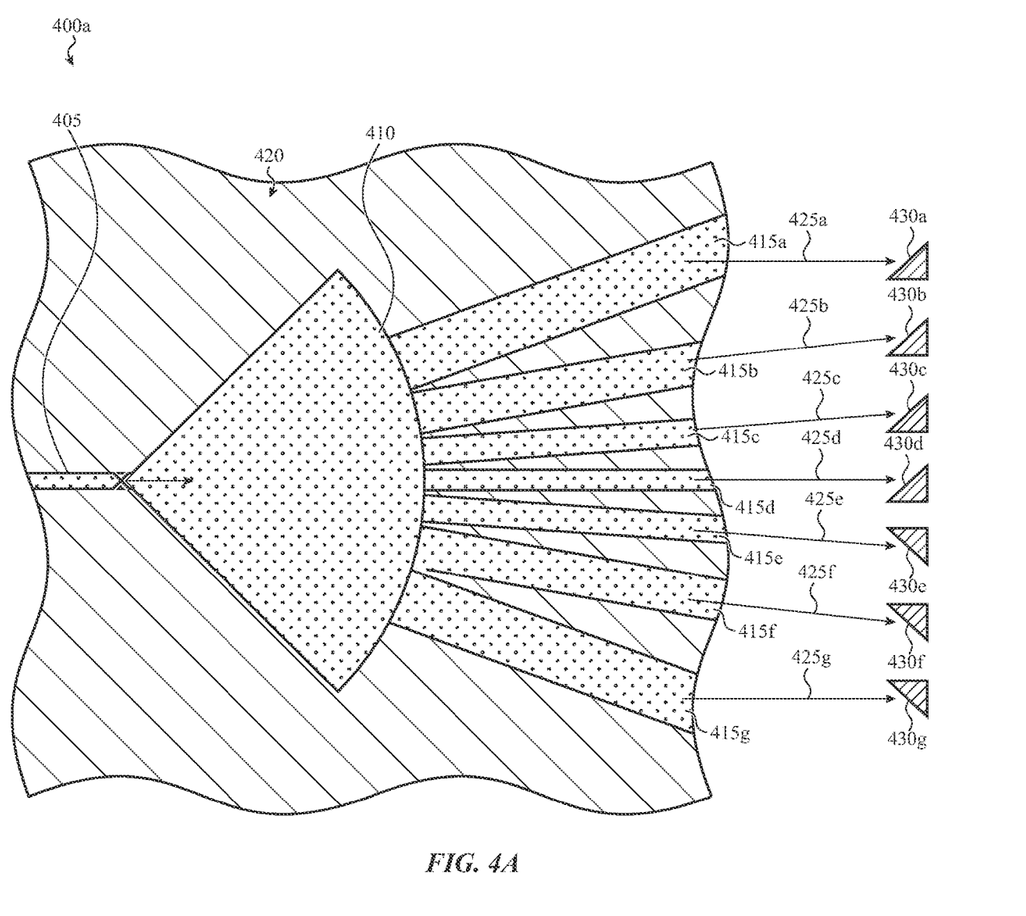
FIG. 4A illustrates an example of an array of output waveguides.

FIG. 4A illustrates an example of another optical splitter. FIG. 4A illustrates an example of the optical splitters described herein and incorporated into a larger optical system that includes outcouplers. As shown, the optical splitter 400 may include an input waveguide 405, a free propagation region 410, an array of output waveguides 415a-415g, and a cladding region 420. The optical splitter 400 may be configured in any suitable manner as described herein and also with reference to the optical splitter 300 of FIG. 3. Additionally, the array of output waveguides 415a-415g may be a depiction of some of the output waveguides as shown in FIG. 3. As previously described with reference to FIG. 3, the output waveguides may couple light along a phase front in the free propagation region 315. Each of the output waveguides may be positioned normal to the local phase front of light, and thus each output waveguide may have a different phase of light. In FIG. 4A, the array of output waveguides includes waveguides 415a-415g. The output waveguides 415a-415g may be uniformly spaced and different, non-uniform widths so that the waveguide channels may receive approximately the same optical power. It may be understood that the center channel output waveguides may be narrower than the outer channel output waveguides as the optical power may be greater toward the center of the free propagation region 410 and may fall off toward the edges. The center channel spacing between the center channel output waveguides, such as 415c and 415d, may be limited primarily by fabrication techniques and may be uniform.

In some instances, the output waveguides 415a-415g may be configured so that the light received by the outcouplers 430a-430g may have different phases. That is, the output waveguides 415a-415g may provide light with different phases 425a-425g to outcouplers 430a-430g. Put another way, the output waveguides 415a-415g may provide light with different group delays. The outcouplers 430a-430g are used for explanatory purposes only, as the light from the output waveguides 430a-430g may be provided to any type of optical element, such as a prism, a mirror, a lens, a collimator, any combination thereof, and so forth. In some examples, the output waveguides 430a-430g may provide light for measurement of a sample or to a reference detector for monitoring light. In some examples, the waveguides may be divided into groups so that the light from multiple output waveguides may be received by one outcoupler. In this example, the grouped output waveguides may positioned closer to one another within the group than to the corresponding outcoupler(s). By grouping the output waveguides, this may create the effect of a "single output" for each waveguide group. In still other embodiments, some of the output waveguides may provide different phases from one another, however the output waveguides within the grouped output waveguides may provide light of the same phase to the corresponding outcoupler(s).

When the output waveguides are discussed above as being positioned normal to the local phase front, it should be appreciated that the waveguide is positioned formal to the local phase front at one point in space (since it is not possible for the waveguide to be normal to multiple points on a curve simultaneously). This point may be selected to help minimize loss (e.g., by positioning the waveguide to be normal to an average tilt of the local phase front encompassed by the waveguide), but may not be able to address all the losses caused by local phase front curvature. This is magnified as the output waveguide grows, and thus may disproportionally impact the outer waveguides. For example, in the output waveguides shown in FIG. 4A, since the output waveguides positioned at the center (e.g., 415d) are smaller, they will see less phase front curvature (and thus the phase front will closer approximate a plane wave). On the other hand, the outer output waveguides (e.g., 415a and 415g) are larger and see a greater amount of curvature. For these reasons, it may be desirable to break up a given output waveguide into two smaller waveguides (each with a different angle relative to the free propagation region), such that each individual waveguide sees less phase front curvature.

Figure 4B:
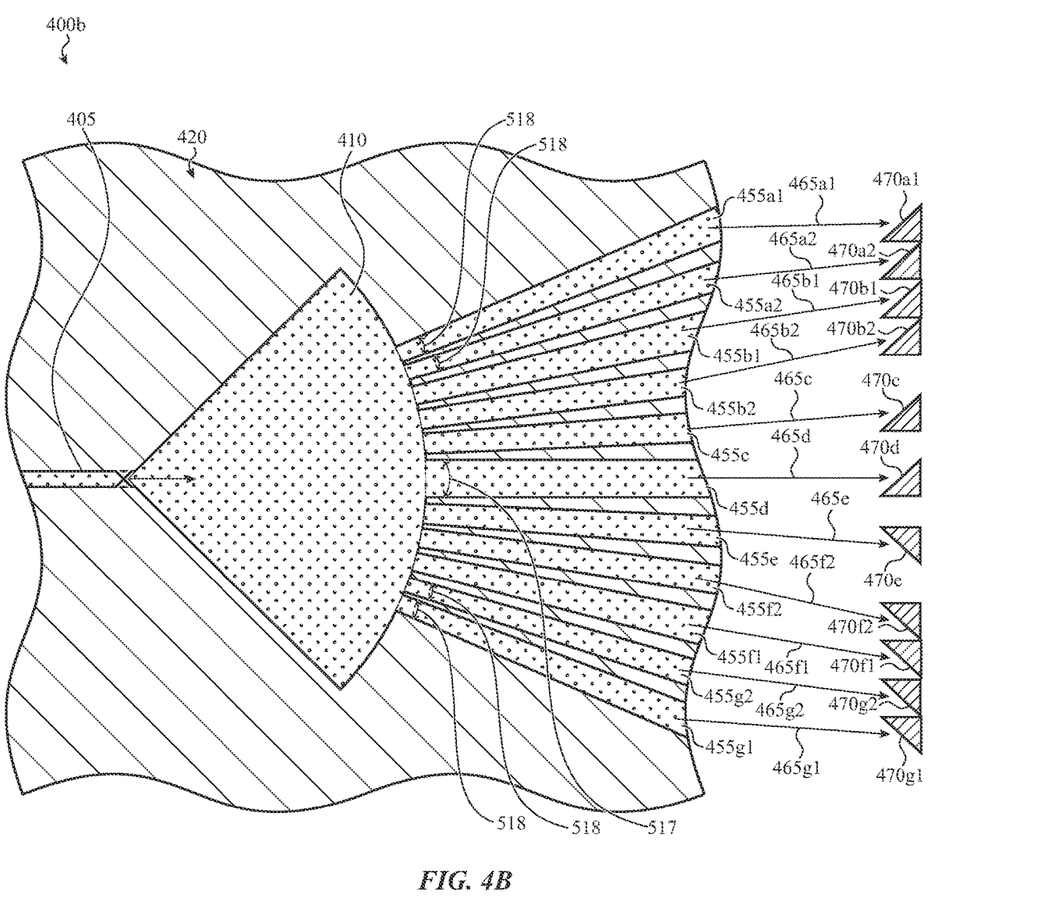
FIG. 4B illustrates an example of an array of output waveguides.

FIG. 4B illustrates an example of another optical splitter with an array of output waveguides. The optical splitter 450 may include an array of output waveguides which are shown as an alternative arrangement of the output waveguides illustrated in FIG. 4A. As previously described with reference to FIG. 3, the output waveguides may couple light along a phase front in the free propagation region 310. Each of the output waveguides may be positioned normal to its local light phase front and so each output waveguide may accept or receive a different phase of light. In FIG. 4B, the optical splitter 450 includes waveguides 455a1-455g1. The output waveguides 455a1-455g1 are non-uniformly spaced and may have similar or different widths so that the waveguide channels may receive approximately the same optical power. The output waveguides 455a1-455g1 may provide light with different phases 465a1-465g1, to outcouplers 470a1-470g1.

The optical splitter 450 may mitigate issues described with reference to FIG. 4A by replacing the outer channel output waveguides with multiple smaller output waveguides. Specifically, the outer channel output waveguide 415a of FIG. 4A may be replaced with smaller outer channel output waveguides 455a1 and 455a2 in FIG. 4B. For examples, the width 517 of inner channel output waveguide 455d is wider than the width 518 of outer channel waveguides 455a1, 455a2, 455g1, 455g2. Additionally, the outer channel output waveguide 415b of FIG. 4A may be replaced with smaller outer channel output waveguides 455b1 and 455b2, as shown in FIG. 4B. By using multiple smaller outer channel output waveguides, each output waveguide may be illuminated by an increased uniform local intensity and the output waveguides may be shifted to match the local phase front.

The outer channel output waveguide 455a1 may output light along light path 465a1 to outcoupler 470a1, and the outer channel output waveguide 455a2 may output light along light path 456a2 to outcoupler 470a2. The outcouplers 470a1, 470a2 may be positioned closer to one another than outcouplers 470c, 470d that receive light from inner channel output waveguides. The outer channel outcouplers 470a1, 470a2 may be positioned close enough that the two portions of launched light may function as a single portion of light from a single inner channel outcoupler, such as outcoupler 470d. Due to the size and spacing of the outer channel output waveguides 455a1, 455a2, light from these waveguides may be launched by the two outcouplers 470a1 and 470a2 as though it is unitary. The smaller outer channel output waveguides 455a1, 455a2 may launch light having the same (or nearly same) phase close to one another, via the outer channel outcouplers. Thus, the optical power of the launched light may combine and so be the same as, or similar to, optical power of light launched by the single outer channel output waveguide 415a of FIG. 4A. In some examples, the light paths 465a1-465g1 may propagate through air, one or more waveguides, and/or through other optical elements that may direct the light toward the corresponding outcouplers.

Although the optical splitter 400 of FIG. 4A may compensate for local intensity variations by using wider outer channel waveguides, once the outer channel waveguides are around double the size of the center channel waveguides, optical loss may be better mitigated using the optical splitter 450 of FIG. 4B with the increased number of smaller outer channel output waveguides. The increased number of smaller outer channel output waveguides may mitigate for the non-uniform intensity of the Gaussian diffracting wave front of light by changing the density and/or spacing of the output waveguides. FIG. 4B illustrates two smaller outer channel output waveguides that may replace the single outer channel output waveguide, for explanatory purposes only as two or any other number may replace the outer channel output waveguides. The splitting function of using multiple smaller outer channel output waveguides may provide for low total optical loss and wavelength independence.

In some examples, the spacing between the output waveguides 455a1-455g1 of FIG. 4B may have uniform spacing or half uniform spacing. In some examples, the center channel spacing between the center channel output waveguides and the outer channel output waveguides may be different from one another to mitigate the non-uniform optical power distribution of the phase front of light. The center channel output waveguides may have uniform center channel spacing as the phase front may be close to that of a plane wave, whereas the outer channel spacing between the outer channel output waveguides 455a1 and 455a2 and between 455b1 and 455b2 may be half the uniform spacing of the center channel output waveguides. The spacing of the outer channel output waveguides may be half the uniform spacing because the outer channel output waveguides 455a1 and 455a2 may be half the size of the center channel output waveguide 455d. Further, because the output waveguides 455a1 and 455a2 may be treated as a single channel output, the spacing may be smaller and may be half the uniform spacing because the output waveguides are half the size and the two output waveguides are used in the same spacing as a single channel.

In some embodiments, the outer channel output waveguides 455a1 and 455a2 may be half the width of the adjacent outer channel output waveguides 455b1 and 455b2. Similarly, the outer channel waveguides 455g1 and 455g2 may be half the width of the adjacent outer channel waveguides 455f1 and 455f2. Additionally, the summed power received by the outer channel output waveguides 455a1 and 455a2 may receive a similar amount of optical power as the power received by other single waveguides (such as adjacent outer channel output waveguides 455b1 and 455b2) due to the width variation between the outer channel output waveguides 455a1 and 455a2 and the adjacent outer channel output waveguides 455b1 and 455b2.

In some embodiments, the grouped outer channel output waveguides 455a1 and 455a2 also may collect the same amount of light as one of the adjacent outer channel output waveguides 455b1, 455b2. Further, the grouped outer channel output waveguides 455a1 and 455a2 may collect the same amount of light (e.g., optical power) as other grouped outer channel output waveguides. The light provided by each of the grouped outer channel output waveguides 455a1, 455a2 may or may not be evenly distributed between the outer channel output waveguides 455a1, 455a2. Similarly, in any group of output waveguides, the light (e.g., optical power) provided by each of the output waveguides in the group of output waveguides may or may not be evenly distributed between each of the output waveguides in the group. Additionally, each output waveguide in the grouped outer channel output waveguides 455a1, 455a2 may be positioned to collect light of the same phase. Generally, each output waveguide within a group of output waveguides may be positioned with respect to the free propagation region so that the collected light may be the same phase as other output waveguides within the group.

Figure 5:
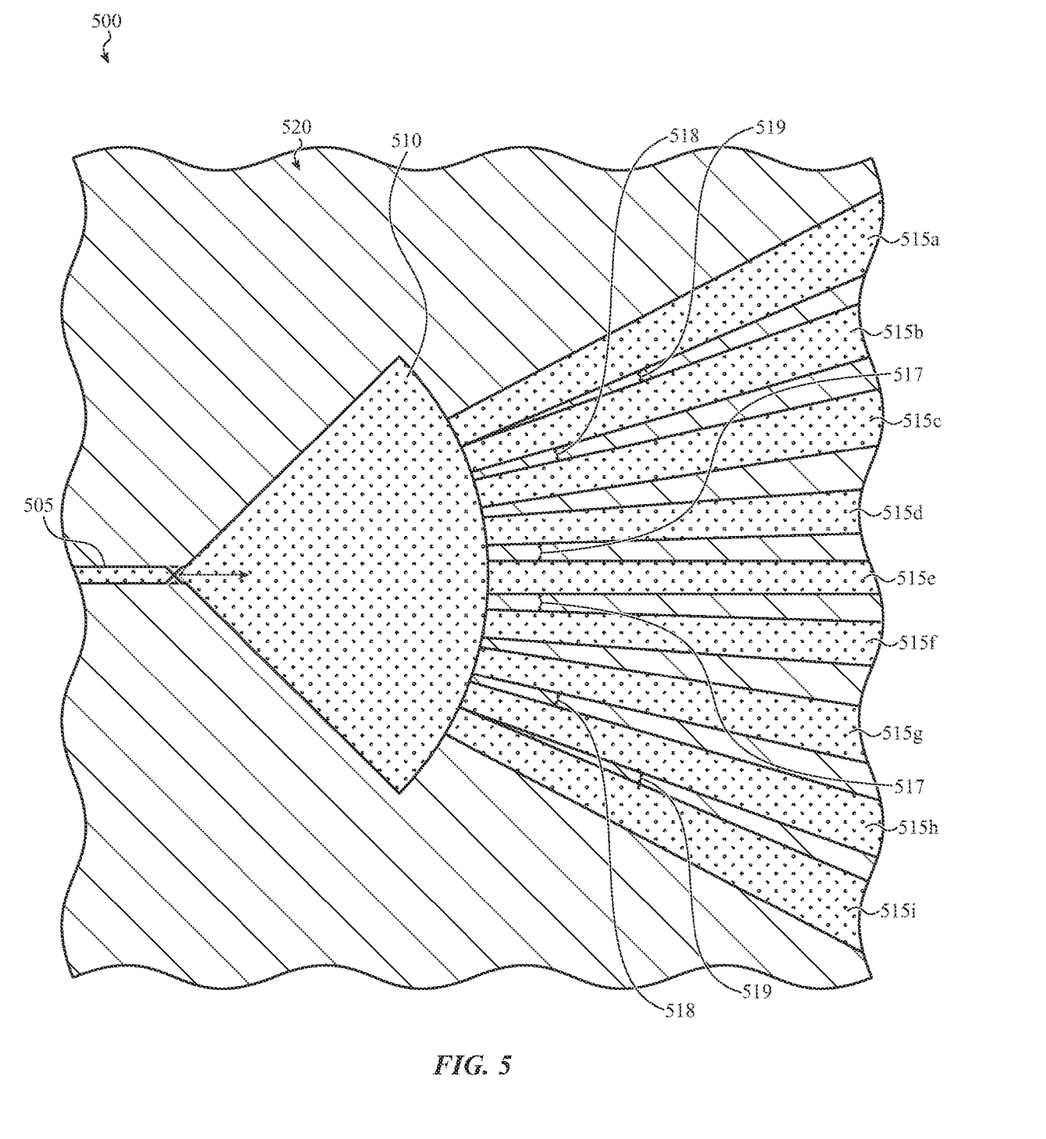
FIG. 5 illustrates an example of an optical splitter.

FIG. 5 illustrates an example of an optical splitter. The optical splitter 500 illustrates that the spacing of the output waveguides may be varied based on the optical power of the light coupled to the output waveguides, while maintaining similar optical power. The optical splitter 500 includes an input waveguide 505, a free propagation region 510, a cladding region 520, and an array of output waveguides 515a-515i. In FIG. 5, the total optical loss may be reduced by adjusting the output waveguide spacing. In some examples, the spacing between a first and second output waveguide may depend on the optical power coupled into each of the first and second output waveguides from the free propagation region.

In FIG. 5, the output waveguide spacing may be determined based on the center channel output waveguides and the optical power coupled into the outer channel output waveguides. The center channel output waveguides 515e and 515f may be approximately centered on the input waveguide so that the center channel output waveguides couple light with uniform and high optical power. Additionally, the center channel output waveguides 515e and 515f may accept a first optical power coupled into the output waveguides from the free propagation region 510. The next neighboring output waveguide 515d may accept 80% of the first optical power, so that the spacing between the output waveguide 515e and 515d may be 80% of the spacing between output waveguides 515e and 515f. Further, the next neighboring output waveguide 515c may accept 60% of the first optical power, thus so that spacing between the output waveguide 515c and 515d may be 60% of the spacing between output waveguides 515e and 515f, and so forth for the remaining output waveguides in FIG. 5. For example, the width 517 between inner channel output waveguides 515e and 515d and inner channel output waveguides 515e and 515f may be wider than the widths 518 between outer channel output waveguides 515c and 515b and outer channel output waveguides 515g and 515h. Similarly, the width 519 may be smaller than all of the widths 517 and 518. In FIG. 5, the output waveguides 515a-515i, may maintain uniformity of optical power received across the output waveguides 515a-515i.

Figure 6:
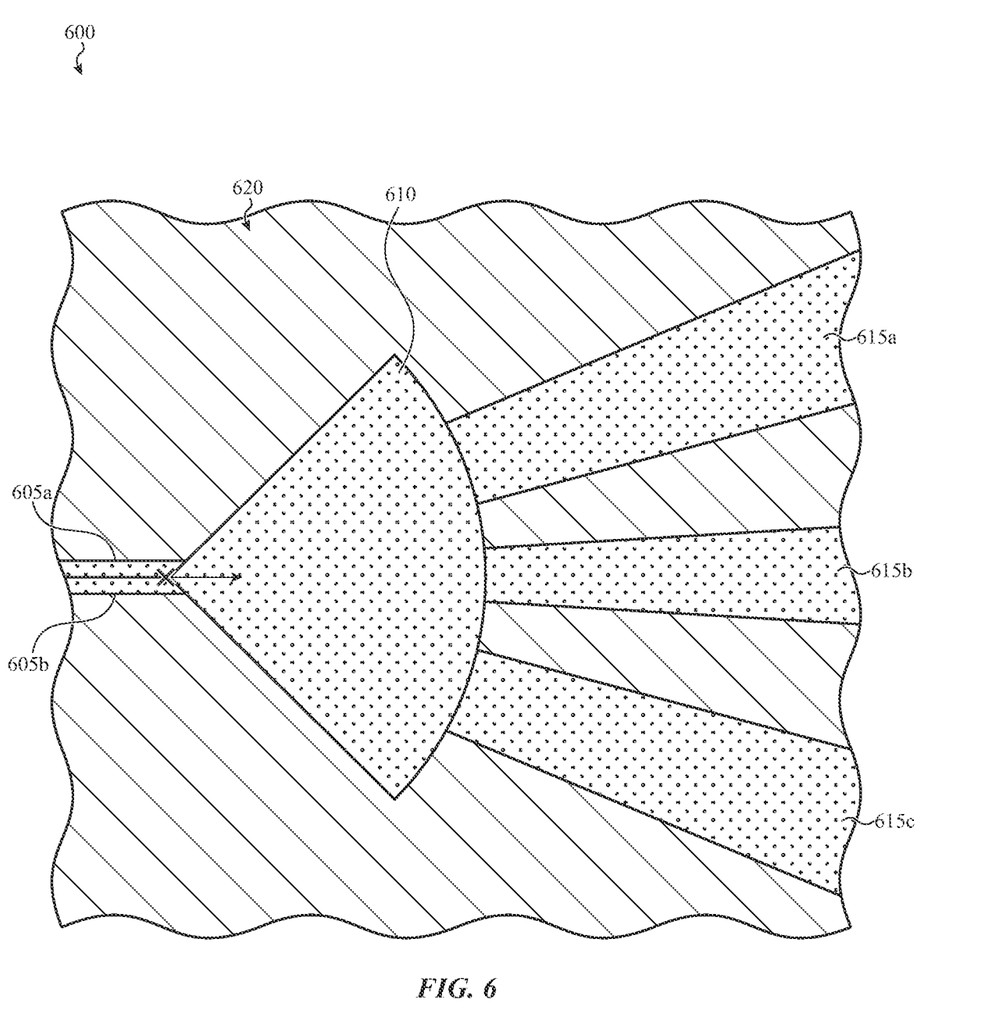
FIG. 6 illustrates an example of a two by three optical splitter.

FIG. 6 illustrates an example of a two by three optical splitter. The two by three optical splitter 600 may include a first input waveguide 605a, a second input waveguide 605b, a cladding region 620, a free propagation region 610, and three output waveguides 615a-615c. In FIG. 6, two input ports and three output ports are used for explanatory purposes only and any number of output ports may be used for the two by N optical splitter. Additionally, the two input ports are used for explanatory purposes only and three or more input ports may be used with this optical splitter, such as for an M by N splitter (where M is the number of input ports and N is the number of output ports of the optical splitter). In some examples, the first and second input waveguides 605a and 605b may receive light from upstream light sources that otherwise would need to be combined before splitting the light out to the output waveguides 615a-615c. Further, in some examples, the number of input ports or waveguides is greater than one, and the total area (e.g., maximum distance along input face of the free propagation region from the centerline) that is defined by all of the input ports or waveguides may be much smaller than the length of the free propagation region or the length of the output port or waveguide array (maximum distance along output face from the centerline).

In FIG. 6, the first and second input waveguides 605a and 605b may experience similar low optical loss as the single input waveguides described with reference to FIGS. 3 and 5. While there may be a small amount of optical loss that may be present as the number of input ports increases, adding a second input waveguide 605b may still provide for acceptable low optical loss. Additionally, the two input waveguide optical splitter 600 may have lower loss than a system that includes a cascading two by one coupler with a one by N star splitter and the two input waveguide optical splitter 600 may have a smaller form factor.

In some examples, the first and second input waveguides 605a and 605b may have similar waveguide parameters as one another, and may not differ from the single input waveguides as described with reference to FIGS. 3 and 5. For example, the first and second input waveguides 605a and 605b may have a high V number in a vertical dimension and a low V number in a horizontal dimension.

The first input waveguide 605a may be positioned as close to the second input waveguide 605b as fabrication processes allow to reduce any optical loss associated with the addition of the second input waveguide. Generally, the first and second input waveguides 605a and 605b may be positioned adjacent to one another and symmetrically about the position where a single input waveguide may be positioned in a single input waveguide optical splitter. In other examples, the first and second input waveguides 605a, 605 may not be symmetrically positioned to where the single input waveguide may be typically positioned.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical splitter, comprising:
an input waveguide configured to input a wavelength range of light to a free propagation region, the input waveguide configured to achieve a proportional relationship between mode size and wavelength across the wavelength range of light at an input edge of the free propagation region;
the free propagation region having the input edge and an output edge, optically coupled to the input waveguide on the input edge, and configured to receive the wavelength range of light from the input waveguide, thereby generating a phase front of light; and
an array of output waveguides optically coupled to the output edge of the free propagation region, wherein:
each waveguide of the array of output waveguides is positioned at a predetermined angle to a local phase front of light of the phase front of light received by each waveguide from the free propagation region; and
the array of output waveguides comprises:
a center channel waveguide having a first width;
a first pair of adjacent outer channel waveguides each having a narrower width than the first width, wherein the first pair of adjacent outer channel waveguides is positioned to receive a summed optical power that is approximately the same as an optical power received by the center channel waveguide.

2. The optical splitter of claim 1, wherein:
the input waveguide has a high V number in a first dimension and a low V number in a second dimension, thereby causing light to diffract at a same diffraction angle across the wavelength range of light;
the predetermined angle is approximately normal to the local phase front of light of the phase front of light received by each waveguide from the free propagation region.

3. The optical splitter of claim 1, wherein:
at least some of the array of output waveguides have non-uniform spacing between one another.

4. The optical splitter of claim 1, wherein the array of output waveguides comprises a second pair of adjacent outer channel waveguides that have a narrower width than the first pair of adjacent outer channel waveguides; and
the second pair of adjacent outer channel waveguides is positioned to receive a summed optical power that is approximately the same as the summed optical power received by the first pair of adjacent outer channel waveguides.

5. The optical splitter of claim 1, wherein a width of at least one of the array of output waveguides depends, at least in part, on an intensity of diffracted light in the free propagation region.

6. The optical splitter of claim 1, wherein:
a first dimension of the input waveguide depends, at least in part, on a first V number of the input waveguide;
a second dimension of the input waveguide depends, at least in part, on a second V number of the input waveguide; and
the first V number is greater than the second V number.

7. The optical splitter of claim 1, wherein an input waveguide mode, as measured in a first dimension, matches a waveguide mode of the free propagation region, thereby reducing optical loss.

8. The optical splitter of claim 1, wherein:
the input waveguide is a first input waveguide;
the optical splitter further comprises a second input waveguide positioned adjacent to the first input waveguide and optically coupled to the free propagation region; and
the first and second input waveguides are symmetrically positioned to input light to the free propagation region.

9. An optical splitter, comprising:
an input waveguide having a high V number in a first dimension, a low V number in a second dimension and configured to input a wavelength range of light;
a slab waveguide with an input edge and an output edge, the slab waveguide optically coupled to the input waveguide and configured to receive light from the input waveguide; and
an array of output waveguides positioned across the output edge of the slab waveguide such that some of the output waveguides are center channel output waveguides and others of the output waveguides are outer channel output waveguides, wherein the array of output waveguides comprises:
a center channel waveguide having a first width;
a first pair of adjacent outer channel waveguides each having a narrower width than the first width, wherein the first pair of adjacent outer channel waveguides is positioned to receive a summed optical power that is approximately the same as an optical power received by the center channel waveguide.

10. The optical splitter of claim 9, wherein:
the input waveguide has the high V number in a vertical dimension and the low V number in a horizontal dimension;
a mode size of the input waveguide is proportional to a wavelength in the wavelength range of light in the horizontal dimension;
in the slab waveguide, a diffraction angle is the same across the wavelength range of light in the horizontal dimension; and
a center channel spacing is uniform for the center channel output waveguides of the array of output waveguides and an outer channel spacing is smaller than the uniform spacing for the center channel output waveguides.

11. The optical splitter of claim 9, wherein at least one of the input waveguide or the array of output waveguides are strip waveguides.

12. The optical splitter of claim 9, wherein the wavelength range of light is one micron.

13. The optical splitter of claim 9, wherein:
the array of output waveguides comprises a second pair of adjacent outer channel waveguides that have a narrower width than the first pair of adjacent outer channel waveguides; and
the second pair of adjacent outer channel waveguides is positioned to receive a summed optical power that is approximately the same as the summed optical power received by the first pair of adjacent outer channel waveguides.

14. An optical splitter, comprising:
a strip waveguide for inputting light across a wavelength range of light;
a slab waveguide configured to receive the wavelength range of light from the strip waveguide; and
an array of output waveguides positioned to receive the wavelength range of light from the slab waveguide; wherein:
a strip waveguide mode size is proportional to a wavelength in the wavelength range of light;
a diffraction angle of light in the slab waveguide is similar across the wavelength range of light; and
the array of output waveguides comprises:
a center channel waveguide having a first width;
a first pair of adjacent outer channel waveguides each having a narrower width than the first width, wherein the first pair of adjacent outer channel waveguides is positioned to receive a summed optical power that is approximately the same as an optical power received by the center channel waveguide.

15. The optical splitter of claim 14, wherein:
a phase front of light of the slab waveguide has a cylindrical phase front;
each waveguide of the array of output waveguides is positioned normal to a local phase front of light in the slab waveguide; and
the array of output waveguides are strip waveguides.

16. The optical splitter of claim 14, wherein the array of output waveguides comprises a second pair of adjacent outer channel waveguides that have a narrower width than the first pair of adjacent outer channel waveguides; and
the second pair of adjacent outer channel waveguides is positioned to receive a summed optical power that is approximately the same as the summed optical power received by the first pair of adjacent outer channel waveguides.

17. The optical splitter of claim 14, wherein:
the strip waveguide has a high V number in a first dimension and a low V number in a second dimension; and
a strip waveguide mode in the first dimension matches a waveguide mode of the slab waveguide, thereby reducing optical loss.

* * * * *